United States Patent

Sandquist et al.

[15] 3,638,970
[45] Feb. 1, 1972

[54] JOINT FOR DOUBLE-WALLED DRILL PIPE

[72] Inventors: Alvin V. Sandquist; Floyd Walter Becker, both of Calgary, Alberta, Canada

[73] Assignee: Becker Drilling (Alberta) Ltd., Calgary, Alberta, Canada

[22] Filed: Feb. 12, 1968

[21] Appl. No.: 704,815

[52] U.S. Cl. .............................285/24, 285/133 R, 285/369
[51] Int. Cl. .........................................................F16l 35/00
[58] Field of Search ..................285/133 R, 133 A, 138, 142, 285/371, 24, 369, 370, 347, 27; 138/114; 175/215, 60, 69, 71, 333

[56] References Cited

UNITED STATES PATENTS

| 1,909,075 | 5/1933  | Ricker et al. ...........................285/133 |
| 2,610,028 | 9/1952  | Smith......................................285/133 |
| 3,065,807 | 11/1962 | Wells......................................285/133 |
| 3,208,539 | 9/1965  | Henderson..........................285/133 X |
| 2,054,859 | 9/1936  | Kitching ................................285/133 |

FOREIGN PATENTS OR APPLICATIONS

| 288,017 | 6/1963 | Austria...................................285/133 |
| 143,469 | 4/1903 | Germany................................285/133 |

*Primary Examiner*—Dave W. Arola
*Attorney*—William George Hopley

[57] ABSTRACT

A length of double-wall pipe for a reverse circulation drill string having an outer pipe and a concentrically disposed inner pipe, the outer pipe of which has threaded box and pin ends and the inner pipe fixed coaxially in the outer pipe and disposed concentrically to provide an annular flow passage between said pipes by longitudinal spacing members engaging said inner and outer pipes and bridging said flow passage. A connector tube joining sections of inner pipe comprising a central portion having an inner diameter the same as the inner diameter of the inner pipe and having sleeve end portions formed with a coaxial bore having an inner diameter larger than the exterior diameter of the inner pipe for engaging the inner pipe as a free sliding fit and fluid seal means in said sleeve end portions for frictionally engaging the ends of the inner pipe of adjacent pipe lengths connected together by threaded engagement of said box and pin ends.

5 Claims, 7 Drawing Figures

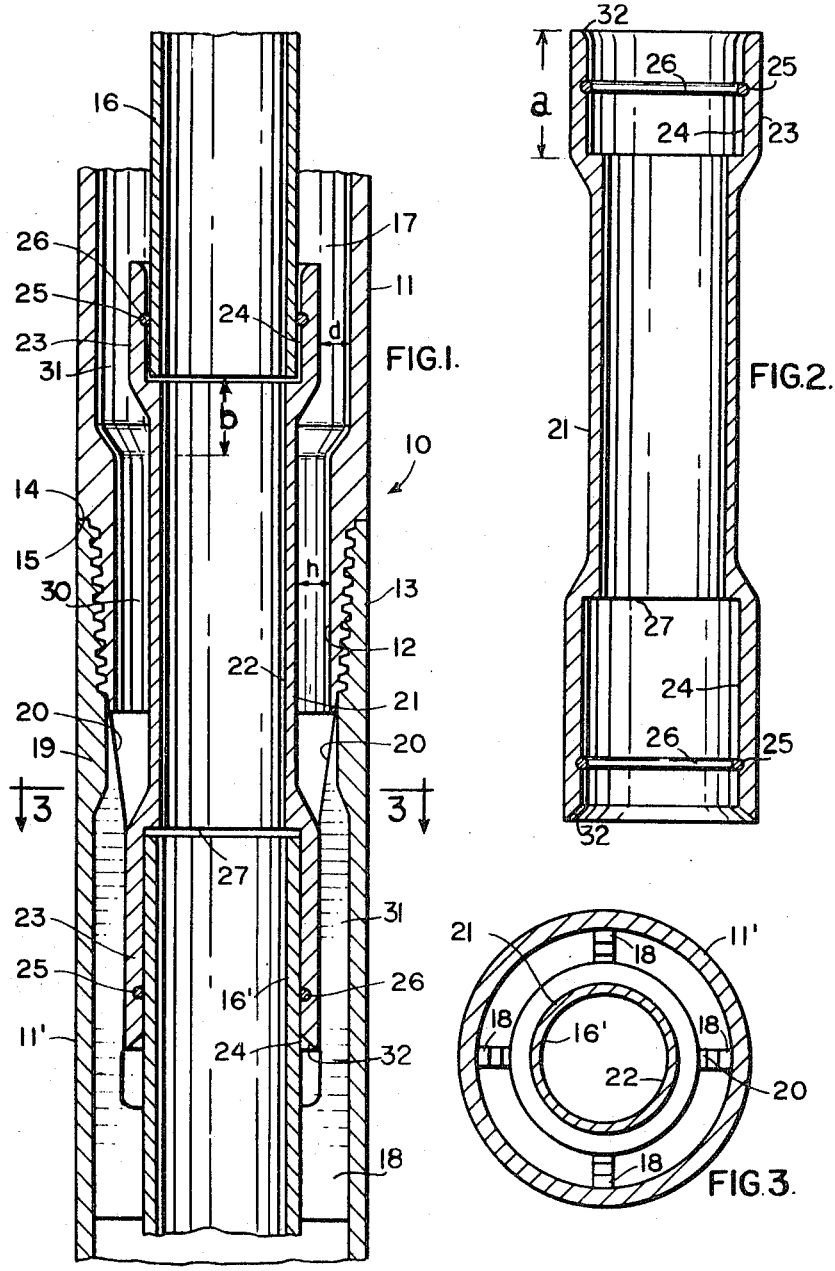

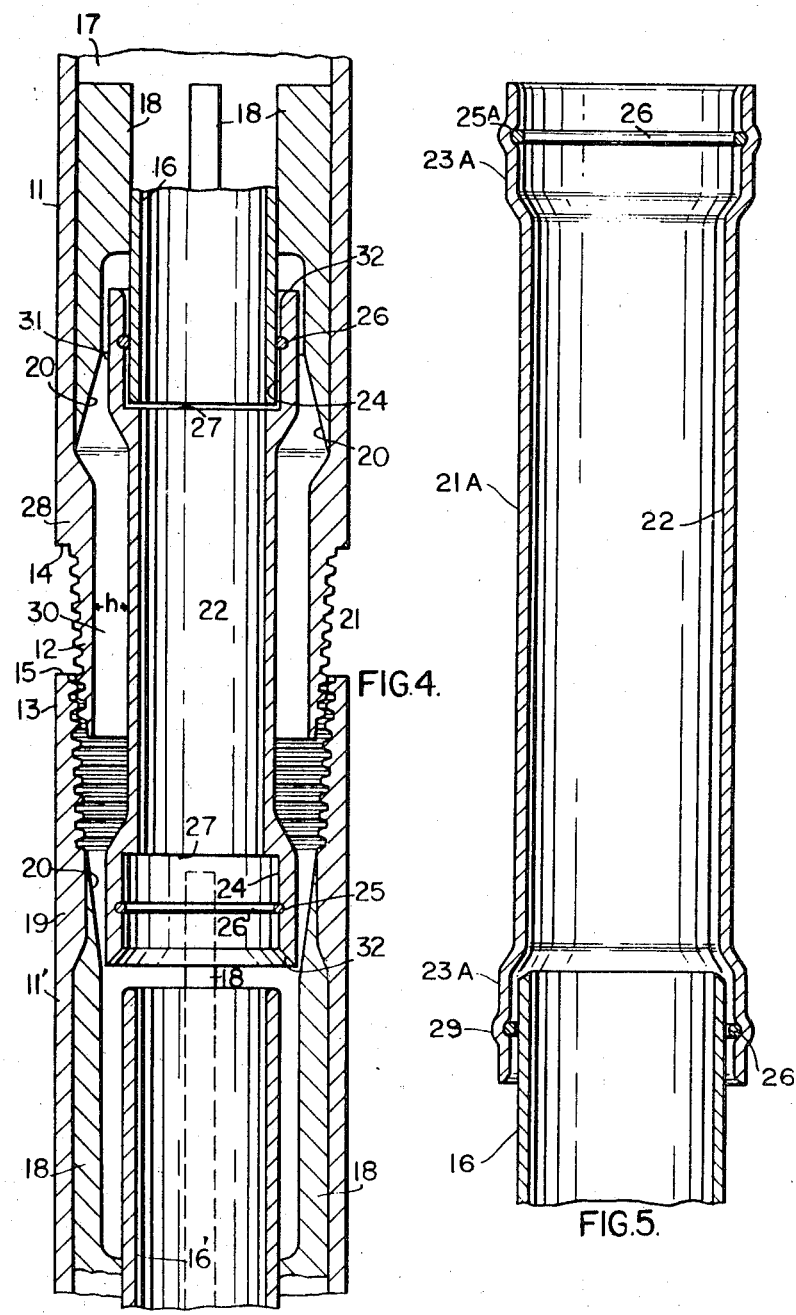

PATENTED FEB 1 1972

INVENTOR.
ALVIN V. SANDQUIST &
FLOYD W. BECKER
BY William G. Hopley
PATENT AGENT

JOINT FOR DOUBLE-WALLED DRILL PIPE

This invention relates to improvements in pipe joints for double-walled pipe strings and more particularly the objective we have in view is to provide a means for joining the inner pipes of adjacent lengths of such strings, wherein a nonthreaded sleeve-ended connector tube is manually fitted to one inner pipe end and the other tube end automatically mates axially with the inner pipe of the other length when the joint is made up.

In prior art rotary drilling with a double-walled drill pipe, wherein a light fluid or a gas such as air is supplied under reverse circulation for cooling the bit and carrying the fragments upward within the inner pipe, the circulation is opposite to that of a long established convention, i.e., instead of flowing down the central pipe and then upward in the annular space between the borehole wall and the outer pipe, the fluid passes down the hole within an annular space bounded by inner and outer pipes of the string. One form of double-walled pipe for reverse circulation has been disclosed by H. I. Henderson in U.S. Pat. No. 3,208,539, this publication describing pipe structure wherein inner and outer pipes are coextensive and have their ends in a common plane transverse to the drill pipe axis, only the outer pipe being threaded and neither pipe having upset or thickened ends. In making up the joint using the Henderson pipe, the pin end of the outer pipe is registered over the box end of an aligned length of drill pipe, and the operator attempts to precisely center the pin within the upper end of the box so that the closely-fitted pipe sleeve carried by the inner pipe may begin to axially slide over the plain end of the inner pipe in the box end. Due to the fact that the outer pipes are taper threaded in the usual way, a considerable radial play exists between the mating ends of the outer pipe, until their taper threads have engaged to the point where they are concentric. In the crucial stage of making up the joint until axial alignment is positively attained, the inner pipe ends sustain all of the forces developed by misalignment, and all shock if one pipe end should drop on the other. As a consequence, the O-ring gas seal within the sleeve end is easily damaged, and the entire pipe length must be removed until repair is effected.

In transport and storage of pipe, and in ordinary handling on a rig, due to the face that the inner pipe of this prior art projects flush with the ends of the outer pipe and is of relatively lighter weight, its ends are highly vulnerable and are easily damaged through knocking about, dropping onto the ground, or standing on any rough surface so that the weight is taken by the inner pipe.

Our improved joint according to the present invention avoids the defects previously noted, by providing a robust and durable assembly wherein all resilient seals such as O-rings are removed from the lengths of drill pipe and wherein the inner pipe ends are recessed axially far enough within the box and pin ends of the outer pipe so as to remain spaced well apart when the joint is made up; the inner pipe ends are bridged by a short, separable sleeve-ended connector tube which is manually insertable into one end to fit one sleeve end upon the inner pipe end, thereby extending it beyond the end of the outer pipe, the other sleeve end of the tube being guidedly insertable into the mating end of another aligned length to couple with the inner pipe thereof by axially sliding over its end. In preferred embodiments the sleeve end is controlled to automatically effect centering with, and registry on, an inner pipe end, either at the pin end or at the box end or at both, by engaging tapered rib guides prior to engaging the inner pipe, or by being coaxially guided within an inwardly thickened end of the outer pipe prior to engaging the inner pipe.

By making the sleeve bores a loose fit over the inner pipe ends, and incorporating O-rings seals to ensure fluid sealing despite minor misalignment of the the inner pipes of the pipe lengths, the lift of the O-rings is greatly extended, and inspection of their condition requires only a glance into the sleeve bores prior to inserting the connector tube into the end of a drill pipe. Any defective seal may be simply replaced on the spot, or where an ample stock of connector tubes is provided another tube is chosen.

In carrying our invention into effect we provide a drill string having a constant diameter of the outer pipe and a constant diameter of the inside pipe conditions essential in any practical string for high speed rotary drilling, while also maintaining the cross-sectional area in the annular region between the connector tube and the inwardly thickened joining ends of the modern well designed high-strength drill pipe unrestricted by protuberances. When the cross section of this annulus is designed to be of equivalent or larger area than the cross section of the inner pipe, pressure drop is minimized so that the larger part of the fluid supply pressure is available at the bit nozzles and also for elevation of fragments. While it is an inherent limitation that the flow cross section of this annulus, hereinafter called the joint annulus, must be smaller than the flow cross section of the annular passages bounded by the connector tube's sleeve ends and the unthickened inner wall of the outer pipe, hereinafter called the sleeve annulus and must be smaller still than the flow cross section of the main annulus, which is the passage defined by the walls of the inner and outer pipes, the axial length of the joint annulus is a small fraction of the length of a drill pipe. It has been found that even where the joint annulus area is a little smaller than the inner pipe cross sectional area, sharp bends and rough shoulders in the outer pipe walls at the joint and at the sleeve ends of the connector tube can be the cause of far higher head losses, where velocities are several hundreds of feet per second; consequently, due regard must be taken in shaping all surfaces of the connector tube and of the outer pipe ends to obtain smoothest possible flow.

Practical designs incorporating the principles of the invention are characterized in that the end of the inner pipe is spaced axially at distance at least 0.3 times the outside diameter of the inner pipe from the thickened part of the outer pipe, and preferably up to about 0.7 times this diametral distance, to ensure that the passage leading from the joint annulus to the sleeve annulus may be smoothly and gradually tapered in its wall surfaces for least head loss. The sleeve length should be such that the bore in which the inner pipe end is received is 0.5 or more times the outer diameter of the inner pipe.

In the assembled joint, the connector tube should not transmit any axial or torsional stresses between the inner pipes it joins. In particular the ends of inner pipes of adjacent joined lengths of drill string should be spaced apart by a distance which is slightly greater than the distance measured axially between the inward ends of bores in the sleeve ends. The compression of the O-rings by the outer surfaces of the inner pipes, while adequate to ensure a fluid seal, will ordinarily not prevent relative rotation during making up of the outer pipes in a joint, and during rotation of the drill string the connector tube will be in passive equilibrium with and carried by the inner pipes.

In a first version of the invention, for double-walled drill pipes in drilling systems wherein the cross-sectional area of the joint annulus is permitted to be fractionally smaller than the cross-sectional area of the inner pipe, but wherein the main annulus has a considerable larger area, guidance and registration of the sleeve ends of the connector tube to obtain automatic centering on the inner pipe ends is provided by thickening the sleeve walls so that these are a sliding fit in the pin end. When the sleeve ends are well rounded, and have an internal bevel to facilitate self-centering with the end of an inner pipe, manual setting of one sleeve end in the box end will be readily effected even though the internal diameter of the box end thickened portion is somewhat greater than the sleeve diameter. The subsequent lowering of the pin end and the seating of the upwardly projecting sleeve end in the opening is easily accomplished. Once the sleeve has entered the pin end opening, safe and positive concentric fitting of the sleeve over the inner pipe end is assured.

In a second version of the invention, in which the joint annulus has a cross-sectional area considerably greater than the cross-sectional area of the inner pipe, the sleeve diameter will inherently be less than the least internal diameter of the pin end of the outer pipe; guidance is therefore provided at either or both the pin and box ends, by longitudinal ribs spaced about and connected with the internal periphery of the outer pipe and extending axially beyond the end of the inner pipe, tapered portions of the extending parts of the ribs engaging the sleeve end of the connector tube to positively center it on the inner pipe. The inward margins of the ribs are relieved to pass the sleeve.

The invention may be the better understood by a careful reading of the following description, in conjunction with the accompanying figures of drawing, wherein:

FIG. 1 is an elevation view of a longitudinal diametrical cross section of the joined ends of two lengths of double-walled pipe having their inner pipes connected to form a continuous passage by a separable connector tube;

FIG. 2 is a longitudinal diametral section of the connector tube of FIG. 1;

FIG. 3 is a cross section transverse to the pipe axis taken along section line 3—3 of FIG. 1, showing spacer guiding ribs;

FIG. 4 shows the initial relation of the elements of FIG. 1 and the setting of the connector tube in one pipe end prior to automatic engagement of the tube sleeve with the lower inner pipe;

FIG. 5 is a longitudinal diametral cross section of an alternative connector tube formed by swaging enlarged diameter sleeve ends in a seamless tube length and rolling O-ring grooves;

Figures 6, 7:
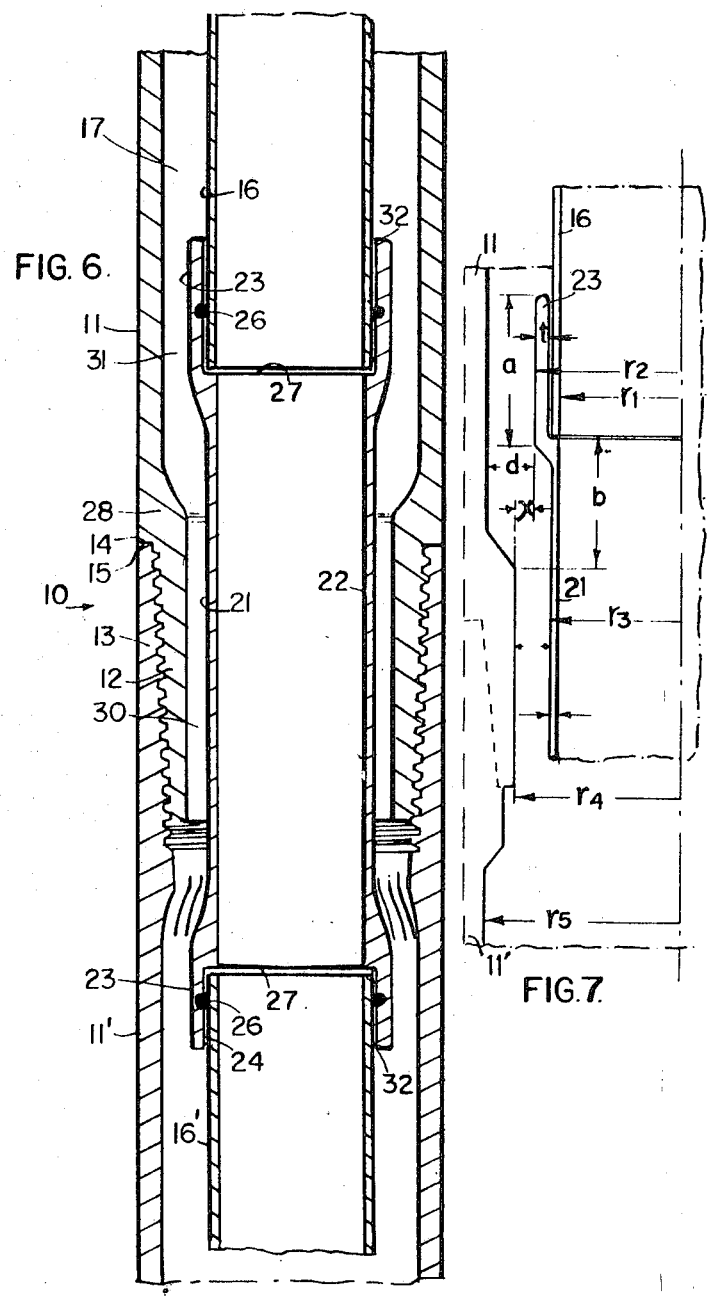
FIG. 6 is an elevation view of an alternative pipe joint in longitudinal diametral section employing tube-guiding principle; and, FIG. 7 is a diagram showing relationship of the elements of a joint and the relative dimensions concerned.

Referring to the drawing, a joint member 10 of a drill pipe string comprises respective outer pipes 11 and 11′ (FIG. 1), having respective threaded pin end 12 and box end 13, with shoulder 14 of the pin end abutting the pipe end 15 of the box end, as in conventional joints between lengths of drill pipe having thickened ends. The upper pipe lengths carries inner pipe 16 concentric with its companion outer pipe 11 and fixed thereto by spacers (not shown) to provide an annular flow passage 17, while the lower pipe length has a similar inner pipe 16′ held within its outer pipe 11′. The latter has a series of angularly spaced longitudinal ribs 18, secured both to the inner and outer pipes, and extending toward the inwardly thickened box end portion 19 for a distance beyond the end of the inner pipe. Each rib terminates as a tapering portion extending to a point just short of the box end pipe threading, the tapering portion having a sloping face 20 extending from a point roughly corresponding to the end of the inner pipe, and has the inward margins relieved to provide a clearance between the inward margin and the inner pipe surface. Similar rib members are alternatively provided adjacent the thickened end portion 28 of the pin end, as in FIG. 4.

A connector tube 21 is assembled between the opposed ends of the inner pipes 16 and 16′, the bore 22 thereof being of identical diameter with the inner pipe diameter, and the tube carries sleeve end portions 23 telescopably fitted over the ends of the inner pipes. The bore 24 of each sleeve portion is or such diameter that the sleeve portion is a loose fit over the inner pipe end. An internal groove 25 located about midway along the length of the bore receives an O-ring 26 which projects inwardly of the sleeve internal surface, to provide a frictional grip and fluid seal against the exterior surface of the inner pipe end. A shoulder 27 is provided at the junction of bore 22 with bore 24, providing a limit stop when the sleeve portion is axially engaged on the inner pipe.

Referring also to FIG. 7, it will be seen that the radial dimension $h$ of the joint annulus 30 between the inwardly thickened pin end portion 28 and the central portion of the connector tube is constant, and that the annular space is bounded by smooth, parallel walls. $h$ is the difference between radius distance $r_4$ to the inside wall of the pin and the radius distance $r_3$ to the outside wall of the connector tube, and therefore depends on the tube wall thickness $p$. At fluid supply pressure of about 100 p.s.i.g., $p$ may be about 0.090 inches.

The dimension $d$ of the sleeve annulus 31 between the inner surface of the outer pipe 11 and the exterior of sleeve 23 is also constant and is determined by the inner pipe thickness, the clearance provided in bore 24, and the thickness $t$ of the sleeve wall. The latter is preferably thicker thin $p$ to withstand handling, and may be about 0.12 inch or more, to accommodate groove 25 and end bevelling 32.

In drill pipe of smaller diameters, where $r_4$ may readily be chosen to be about 1.5 times $r_1$, and thereby to set $h$ at a value making the annulus 30 of equal cross-sectional area with inner pipe, it is possible to thicken the sleeve wall dimension $t$ tand thereby to diminish the clearance distance $x$ which is the difference between $r_4$ and $r_2$, namely pin internal diameter and sleeve exterior diameter, while still maintaining the dimension $d$ of the sleeve annulus adequate. When $x$ is just large enough to provide clearance to pass the sleeve 23 through the pin, and when the sleeve length $a$ exceeds the offset $b$, effective guiding of the connector tube is possible as shown in FIG. 6. In this embodiment no ribs are used. The connector tube may be manually inserted into either the box end or the pin end and the operator may center the box end or the pin end and the operator may center the sleeve on the inner pipe with little difficulty, provided the clearance between the sleeve and the thickened part of the box end is not so great that the bevel 32 cannot readily control centering. It may be found preferable to first set the connector tube by hand to extend upward from the box end, and then to lower the pin end of the aligned pipe length down onto the tube, whose rounded exterior at end 32 will locate itself easily in the opening of the pin end 12.

Since the connector tube has to resist negligible stress loads when fitted in a joint, and serves chiefly to extend the inner pipe and carry seals 26, it may be made of any material such as metal, fiber, plastics or compositions. Very light gauge metal tubes as shown in FIG. 5, whose wall thickness would make difficult machining operations, may readily be fabricated by swaging and rolling the enlarged diameter sleeve ends 23A, and internal grooves 25A to receive the O-ring seals 26, of tube 21A.

The invention is not limited to the precise dimensions and proportions illustrated by the drawings, and it is to be understood that the designs are in no way limiting; double-walled drill pipe of considerably larger diameters of outer pipe are intended to be provided with connector tube portions within the scope of the present invention.

What is claimed is:

1. A length of double-walled pipe for a reverse-circulation drill string comprising an outer pipe and an inner pipe concentrically disposed to provide a flow passage of annular cross section between said pipes, the outer pipe having threaded box and pin ends, said box and pin ends being thickened radially inwardly from the ends of said outer pipes, the ends of said inner pipe being spaced axially inwardly of the pin ends of said outer pipe and being also spaced axially inwardly from the innermost ends of said threaded ends, said inner pipe being fixed coaxially in said outer pipe by longitudinal spacing members engaging said inner and outer pipes and bridging said flow passage and a connector tube comprising a central portion having an inner diameter the same as the inner diameter of the inner pipes and having sleeve end portions formed with a coaxial bore having an inner diameter sufficiently larger than the exterior diameter of the inner pipes for engaging said inner pipes as a free sliding fit, and fluid seal means seated in said sleeve end portions and adapted to frictionally engage the ends of inner pipes of adjacent pipe lengths when the pipe lengths are connected together by threaded engagement of said pin and box ends and wherein said longitudinal spacing members extend along the end portions of said inner pipe and terminate in said thickened end portion of the outer pipe, terminal portions of said spacing members being tapered to guide a sleeve end to concentric engagement axially with an inner pipe end and having their radial inward margins relieved to pass said sleeve end portions.

2. A length of double-walled pipe for a reverse circulation drill string comprising an outer pipe and an inner pipe concentrically disposed to provide a flow passage of annular cross section between said pipes, the outer pipe having threaded box and pin ends, said box and pin ends being thickened radially inwardly from the ends of said outer pipes, the ends of said inner pipe being spaced axially inwardly of the pin ends of said outer pipe and being also spaced axially inwardly from the innermost ends of said threaded ends, said inner pipe being fixed coaxially in said outer pipe by longitudinal spacing members engaging said inner and outer pipes and bridging said flow passage and a connector tube comprising a central portion having an inner diameter the same as the inner diameter of the inner pipes and having sleeve end portions formed with a coaxial bore having an inner diameter sufficiently larger than the exterior diameter of the inner pipes for engaging said inner pipes as a free sliding fit, and fluid seal means seated in said sleeve end portions and adapted to frictionally engage the ends of inner pipes of adjacent pipe lengths when the pipe lengths are connected together by threaded engagement of said pin and box ends and wherein the walls of said box and pin ends have greater thickness in the area which is inward axially from the said ends and wherein said inner pipe ends are spaced from the thickened wall portion by from about 0.3 to about 0.7 times the outside diameter of said inner pipe and wherein said connector tube has a sleeve end portion fractionally larger than said spacing distance and wherein said sleeve ends are thickened and each has an outside diameter which is only slightly less than in the minimum diameter portion of said pipe ends so to be a guided fit within said portions of said inner pipe ends.

3. A pipe as set forth in claim 2 wherein the walls of said outer pipe and said connector tube which define said annular passage are flared in the area where said thickened portions terminate within said outer pipes to present smooth transition portions to fluid flow in said passage.

4. A pipe as set forth in claim 3 wherein said connector tube is formed as a metal body having a smooth inner wall and a smooth outer wall with a gradual change of diameter between a central constant diameter portion and sleeve end portions of larger diameter.

5. A pipe as set forth in claim 4 wherein said connector tube is formed as a metal or other structural body having constant wall thickness and having internal peripheral grooves in said sleeve end portions adapted to seat O-ring sealing elements.

* * * * *